Nov. 21, 1950

R. K. BOYER 2,530,504

GAUGE CHUCK

Filed Oct. 1, 1949

INVENTOR.
RALPH K. BOYER
BY Hudson, Boughton,
Williams, David & Hoffmann
ATTORNEYS Patented Nov. 21, 1950

2,530,504

UNITED STATES PATENT OFFICE 2,530,504

GAUGE CHUCK

Ralph K. Boyer, Lakewood, Ohio, assignor to The Dill Manufacturing Company, Cleveland, Ohio, a corporation of Ohio Application October 1, 1949, Serial No. 119,083

1 Claim. (Cl. 285—163)

This invention relates to an air chuck and particularly to an air gauge chuck.

Air chucks, such as are applied to the valve stem of a pneumatic tire and other inflatable articles ordinarily have a portion which fits over the end of the valve stem, and in such portion there are located a sealing gasket and a central pin or projection for engaging the valve pin of the valve insides or core in the stem to depress the valve pin and unseat the valve thereof. The gasket is subject to wear and deterioration since it is pressed against the end of the valve stem in applying the chuck thereto. It is frequently necessary to replace the gasket in an air chuck, and heretofore air chucks have been so constructed as to render difficult the replacement of the gaskets.

An object of the present invention is to provide an air chuck and particularly an air gauge chuck which is simple in construction, is readily manufactured and assembled, and which is so constructed that the gasket can be quickly and easily removed and replaced by a new gasket.

Figure 1:
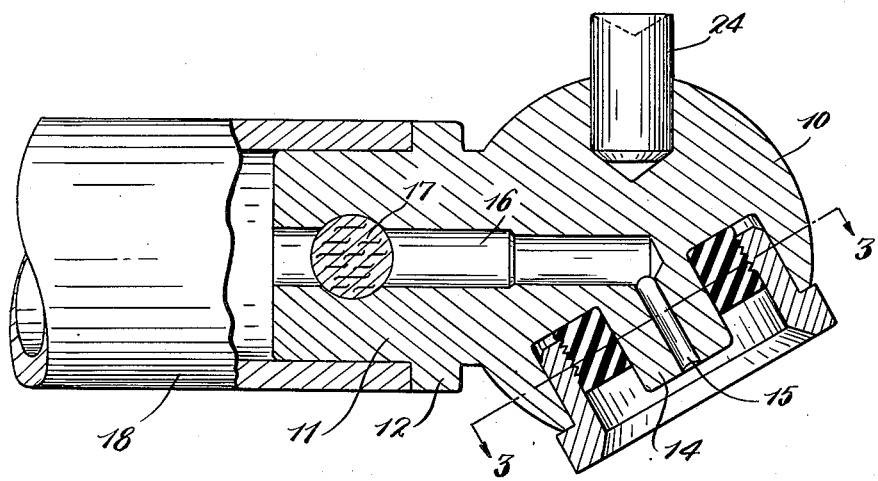
Figure 2:
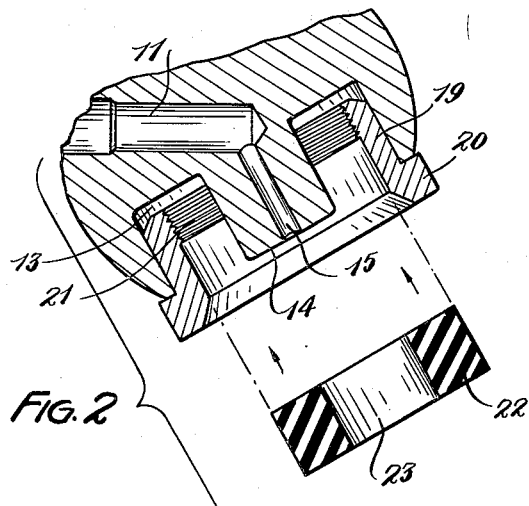
Figure 3:
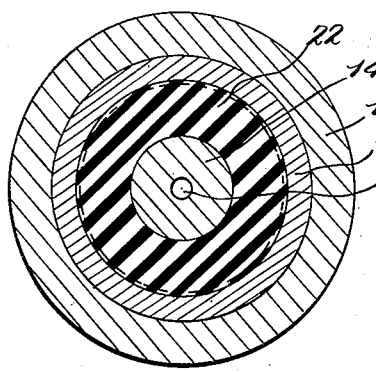

Further and additional objects not above referred to will become apparent during the detailed description of the embodiment of the invention which is illustrated in the accompanying drawing, wherein Fig. 1 is a longitudinal central sectional view on an enlarged scale through an air chuck embodying the invention, a portion of an air gauge being shown partly in elevation and partly in section and connected to the chuck;

Fig. 2 is a sectional, fragmentary view of that portion of the chuck head shown in Fig. 1 which is positioned over a valve stem but illustrates the chuck gasket separated from the chuck and in position to be inserted therein; and Fig. 3 is a sectional view taken substantially on line 3—3 of Fig. 1 looking in the direction of the arrows.

The chuck comprises a body which includes a substantially ball-like head 10 from which projects a gauge or hose attaching portion 11 having adjacent to the ball-like head 10 an external annular flange 12. The head 10 is provided with a flat or chordal exterior surface portion from which extends inwardly of the head a circular recess 13 having centrally thereof an outwardly extending pin or projection 14. The projection 14 is provided centrally thereof with a longitudinally extending passage 15 that communicates at its inner end with a bore 16 extending longitudinally of the chuck from centrally of the head 10 to the end of the attaching portion 11. The portion 11 of the chuck may be provided with a hole therethrough extending transversely to the bore 16 and in which hole a filter 17 can be mounted. An air gauge 18 is illustrated in Fig. 1 as telescoped upon the attaching portion 11 and abutting the flange 12 and secured to the portion 11 in any suitable manner.

It will be seen and understood that the bore 16 communicates with the interior of the gauge 18 and hence the interior of the gauge can be placed in communication with a valve stem through the bore 16 and the passage 15.

A sleeve-like retainer member 19 has a pressed fit in the recess 13 or is otherwise secured therein and is provided at its outer end with an annular flange 20 that bears against the chordal exterior surface of the head 10. The interior of the sleeve or member 19 adjacent its inner end is provided with washer-retaining grooves, depressions, or the like, shown herein for illustrative purposes as in the form of threads 21.

The chuck gasket 22 is formed of suitable natural or synthetic rubber, or other suitable material, and is provided with a central opening 23 of a size to have a tight fit over the projection 14. The gasket 22 is of such overall diameter that it can be forced into the sleeve 19 between the projection 14 and the interior of the sleeve and pressed firmly against the projection 14 and also pressed against the grooves or threads 21 to cause the latter to interlock with the gasket and retain the same in position. The gasket 22 when fully positioned will engage the bottom of the recess 13 in the head 10.

In order to remove the gasket should it become worn through use, or otherwise damaged, it is merely necessary to pry the same out of its position by means of any sharp pointed tool, such as a knife, screw driver or the like. When the gasket has been removed from the chuck, a new gasket can be readily inserted therein.

The head 10 fixedly mounts a pin 24 which extends outwardly beyond the exterior of the head 10 and can be used to depress the valve pin of the valve core or insides in the valve stem to relieve the air pressure in the inflatable container to which the stem is connected when this is desirable or necessary.

It will be understood that in using the chuck and the gauge attached thereto the sleeve 19 will be telescoped upon the valve stem until the end of the stem firmly and sealingly engages the gasket 22. The projection 14 as this is done engages the valve pin of the valve core or insides in the stem and depresses the same to open the valve thereof. This enables the air pressure in the inflatable tire or container to be applied to the gauge through the passage 15 and bore 16 to indicate the pressure in the inflatable tire or container.

Although a preferred embodiment of the invention has been illustrated and described herein, it will be understood that the invention is susceptible of various modifications and adaptations within the scope of the appended claim.

Having thus described my invention, I claim:

An air chuck comprising a head from which extends an attaching portion, said head being provided with a recess extending inwardly of the head, said head including a circular projection located in said recess and having a passage therethrough, said head and said attaching portion being provided with a bore communicating with the inner end of said passage, a sleeve secured in said recess in tight engagement with the wall thereof and provided adjacent its inner end and interiorly thereof with gasket retaining grooves, and a rubber-like gasket having a central opening of a diameter to tightly fit said projection and being of an external diameter such as to be forcible into the space between said projection and said sleeve and to interlock with said grooves, whereby said gasket will be retained in operative position in said head but can be pried readily therefrom when it is desired to replace it with a new and unworn gasket.

RALPH K. BOYER.

No references cited.